Oct. 6, 1964   L. J. KELLER ETAL   3,151,503
TRANSMISSION SYSTEM
Filed Dec. 1, 1958
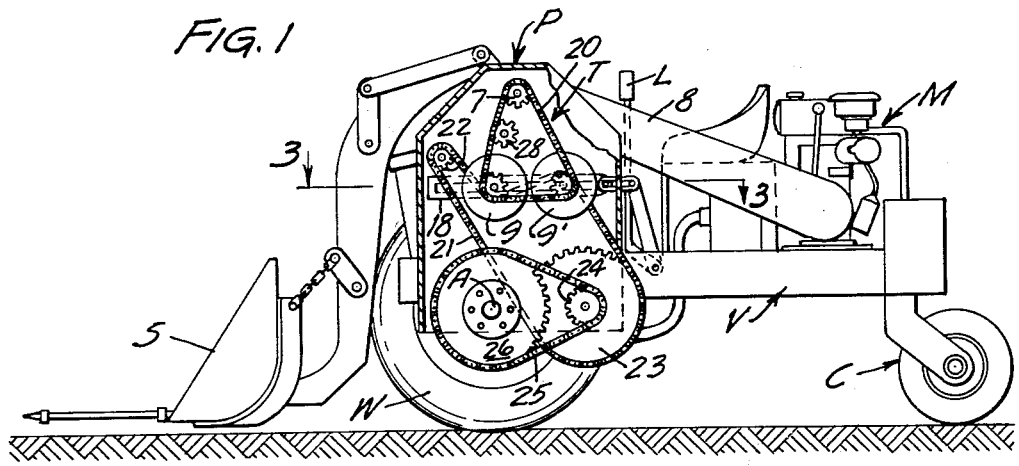
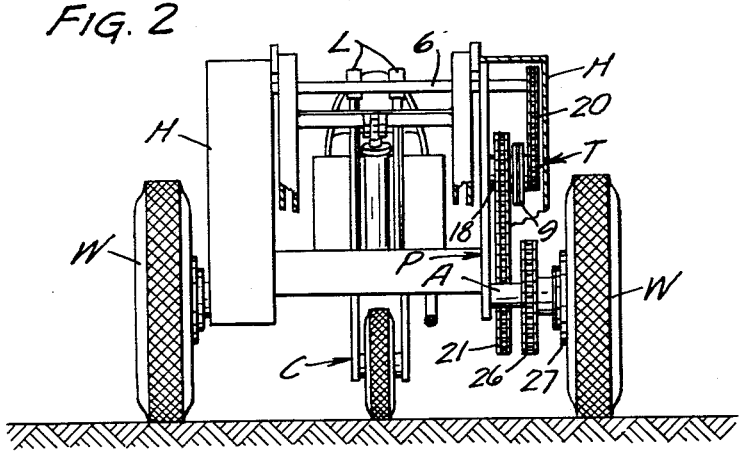
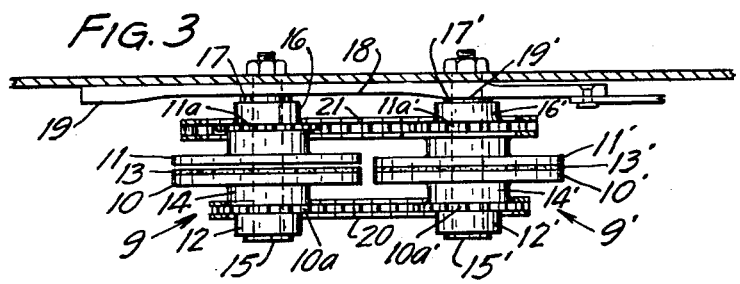
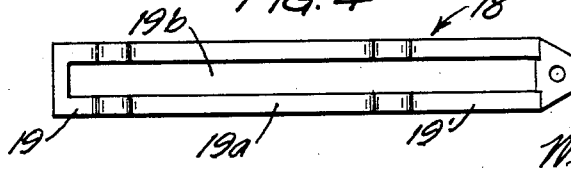
INVENTOR
LOUIS J. KELLER
CYRIL N. KELLER
BY Williamson, Schroeder + Halmatier
ATTORNEYS

United States Patent Office 3,151,503
Patented Oct. 6, 1964

3,151,503
TRANSMISSION SYSTEM
Louis J. Keller and Cyril N. Keller, Rothsay, Minn.
Filed Dec. 1, 1958, Ser. No. 777,268
4 Claims. (Cl. 74—722)

This invention relates to systems for transmitting driving power from a power unit to propulsion wheels, drive shafts and the like, and in particular to a transmission system for self-propelled vehicles having independently rotatable propulsion or drive wheels.

An object of our invention is a transmission system for self-propelled wheeled vehicles such as tractors, loaders, sweepers and the like, which imparts maximum maneuverability to such vehicles.

Another object is a transmission system for each wheel which permits the wheel to be independently driven forwards or backwards or idled as desired.

Still another object is a selective (forward, reverse, neutral drive) transmission system for each independent propulsion wheel for differential driving of the wheels which enable a pair of wheels so equipped to serve not only as the driving mechanism but also as the steering mechanism, the transmission system being particularly adaptable to vehicles having two independent propulsion wheels and a caster or swivel wheel for maneuverability.

A further object is a selective transmission system for an independent propulsion wheel in which the direction or nature of the driving force is altered by a shifting bar whose movements are controlled by a single simple control lever in the cab of the vehicle.

A still further object is a transmission system for an independent propulsion wheel which combines a clutch adapted for forward drive with a clutch adapted for reverse driving in the same system and means for engaging either of said clutches for drive operation or permitting both clutches to disengage causing idling of said wheel.

These and other objects and advantages of our invention will more fully appear from the following description made in connection with the accompanying drawings, wherein like reference characters refer to the same or similar parts throughout the several views, and in which:

FIG. 1 is a side elevational view of a loader vehicle for employing the transmission system of our invention with portions thereof broken away for clarity of detail as an aid to understanding;

FIG. 2 is a front elevational view with a scoop portion of a loader removed and one side of the tractor broken away for clarity;

FIG. 3 is a top plan view of the clutch mechanism taken on the line 3—3 of FIG. 1 in partial section; and FIG. 4 is a detail view of the cammed operating lever.

Referring to the drawings which disclose a preferred form of our invention, a front end loader vehicle indicated generally by the letter V has a pair of laterally spaced independently rotatable propulsion wheels W mounted on dead axles or stubshafts A positioned forward of the vehicle, a motor M mounted thereon for driving said wheels, a caster or swivel wheel C positioned rearwardly of the loader to impart maneuverability and stability to the loader, a scoop S and a pair of spaced vertical supporting plates P. Extending between and through each of the plates P and supported thereby near the top thereof is a horizontally disposed jack or drive shaft 6 having sprocket wheels 7 affixed to the ends thereof outwardly of the plates P, the shaft 6 and wheel 7 being continuously driven or rotated by means of an endless chain enclosed in housing 8 which is connected with and driven by motor M.

The loader is provided with a pair of identical but separate transmission systems for transmitting the driving power from jack shaft 6 to each of the propulsion wheels W, each of said transmission systems being mounted on and supported by a plate P and indicated generally by the letter T, each of said transmission systems being enclosed by a housing H. The separate but identical transmission systems T mounted on each of the plates P are adapted to selectively transmit forward or reverse driving power from the jack shaft 6 to one of the propulsion wheels W, and is also adapted to permit idling of the wheel when desired.

In the form of our invention shown in the drawings, each transmission system T includes a pair of clutch units indicated generally by 9 and 9', one unit being for forward drive, the other for reverse drive. These clutch units each consist of a pair of clutch plates 10 and 11 and 10' and 11' respectively which are rotatably and coaxially mounted on horizontally spaced stubshafts 12 and 12' respectively, which shafts project laterally outwardly from and are supported by plate P, the opposing clutch plates being adapted for movement into radial frictional clutching engagement with one another.

Each of the clutch plates has projecting therefrom and coaxially united therewith a sprocket wheel for rotating the clutch plate, these sprocket wheels being indicated by the numerals 10a, 11a, 10a' and 11a' respectively. One clutch plate of each clutch unit has superimposed on and secured to its clutching surface a friction disc as indicated by 13 and 13' respectively. The outwardly disposed sprocket wheels 10a and 10a' abut with bearings 14 and 14' and are held on shafts 12 and 12' by means of end caps 15 and 15' respectively. Inwardly disposed of sprockets 11a and 11a' are bearings 16 and 16' and pressure collars or cam followers 17 and 17' which are mounted coaxially with sprockets 11a and 11a' on stubshafts 12 and 12', and are axially movable thereon. Said pressure collars 17 and 17', bearings 16 and 16', sprockets 11a and 11a' and clutch plates 11 and 11' are slidable back and forth along shafts 12 and 12' to enable plates 11 and 11' to move into and out of clutching engagement with friction discs 13 and 13' respectively, causing plates 11 and 11' to be rotatably driven by opposing revolving plates 10 and 10' respectively.

Mounted on plate P and interposed between plate P and cam followers 17 and 17' is an elongate shifting bar 18 whose outer face tapers inwardly from the ends thereof so that the thickest or drive portions 19 and 19' of the bar are found adjacent the ends thereof, and form camming surfaces which selectively engage the inner surfaces of cam followers 17 and 17' to move their respective clutches into driving engagement. The thinner central portion 19a of the shifting bar represents the neutral portion, and is of a length to permit it to oppose both cam followers simultaneously to disengage both clutches simultaneously and permit idling of the wheel W. Longitudinal slot 19b of bar 18 encloses stubshafts 12 and 12', and bar 18 is adapted to slide horizontally back and forth normal to the stubshafts 12 and 12' to selectively engage cam followers 17 and 17' and slide them in and out as they engage different parts of the cam surface, causing them to bear against their respective bearings which in turn bear against their respective sprockets and clutch plates 11 and 11' causing them to slide or move into clutching driving engagement with their respective plates 10 or 10'. Each of the bars 18 are caused to move backwards and forwards by means of one of the operating levers L in the cab of the vehicle, which are connected by suitable linkage to the bars.

Endless chain belt 20 is trained around sprocket 10a, 10a', chain belt tightner sprocket 28 and sprocket 7 of jack shaft 6 as shown in FIG. 1, causing clutch plates 10 and 10' to be rotated or driven continuously in the same direction (counterclockwise as shown in the drawings) by the continuously rotating jack shaft 6 and sprocket 7.

As shown in the drawings, endless chain 21 is trained over sprocket 11a' and under sprocket 11a and thence around a rotatable idler or belt tightener sprocket wheel 22 and rotatably mounted gear reduction sprocket wheel 23 which is connected with and serves to rotate smaller reduction sprocket 24. Another endless chain 25 is trained around sprocket 24 and a sprocketed wheel 26 which is integrally united with, and serves to drive a wheel mounting disc 27 upon which is mounted wheel W.

By training the endless chain 21 under one sprocket wheel and over the other, the chain 21, and with it wheel W, will be driven in opposite directions according to which clutching unit is engaged, thereby providing selective reverse and forward driving of the propulsion wheel W.

In the operation of the form of our invention as shown in the drawings, in which only the transmission system for the left side of the vehicle is shown and described, the jack shaft 6 and clutch plates 10 and 10' are driven continuously in a counterclockwise direction. To drive the left side propulsion wheel W forward, the shifting bar 18 is moved forward by proper manipulation of one of the operating levers L in the cab until the various portions of the clutch assembly assume the positions shown in FIG. 3.

In the arrangement shown in FIG. 3, the drive camming surface 19' of bar 18 engages cam follower 17' and presses it outwardly, forcing the clutch plates 10' and 11' into clutching driving engagement, while cam follower 17 is opposed by the neutral surface 19a, which causes clutch unit 9 to be disengaged. Because the endless chain 21 is trained over sprocket 11a', which is driven counterclockwise in FIG. 3, the chain 21 is also caused to move in a counterclockwise direction which in turn, through the gear reduction and chain drive mechanism shown, drives propulsion wheel W in a counterclockwise or forward direction, thus in effect making clutch unit 9' the forward drive unit.

To drive the propulsion wheel rearwardly or in reverse direction, the shifting bar is moved backwards or to the rear, causing drive cam surface 19 to engage cam follower 17 and press clutch plates 10 and 11 into clutching engagement, with cam follower 17' moving into opposition with the neutral surface 19a, causing disengagement of clutch unit 9'. In this situation, with the sprocket wheel 11a being driven counterclockwise and the chain 21 being trained thereunder, the chain 21 is driven in a clockwise direction and in turn causes propulsion wheel W to rotate in a clockwise or reverse direction, thus in effect making clutch unit 9 the reverse drive unit.

To permit idling of the propulsion wheel W, the shifting bar 18 is moved to an intermediate or neutral position in which both cam followers 17 and 17' are placed in opposition to the thinner neutral surface 19a, causing disengagement of both clutching units 9 and 9'.

It is, of course, to be understood that the foregoing description applies equally well to the operation of both transmission systems and propulsion wheels on either side of the vehicle.

From the foregoing, the advantages of our invention are readily apparent. By manipulating the pair of operating levers in the cab, the propulsion wheels W may be simultaneously driven forwards or backwards to cause forward or reverse movement of the vehicle, or one wheel may be idled while the other is driven forwards or backwards, thus permitting the vehicle to pivot on the idle wheel and be turned in any desired direction, thus giving the vehicle maximum maneuverability and permitting the transmission system in cooperation with the propulsion wheels to perform the dual functions of driving and steering the vehicle.

It will, of course, be understood that various changes may be made in the form, details, arrangement and proportions of the various parts without departing from the scope of our invention.

What is claimed is:

1. In a self-propelled vehicle having independently rotatable propulsion wheels and a source of power for driving said wheels, a separate transmission system for propelling each of said wheels, each said transmission system comprising a pair of clutches, each said clutch comprising a pair of rotatable, coaxially mounted clutch plates adapted for movement into and out of frictional clutching engagement with one another, belt drive means interconnecting one clutch plate of each clutch with each other and with the source of power and adapted to rotate said clutch plates simultaneously in the same direction, belt drive means interconnecting the other clutch plate of each clutch with each other and with the propulsion wheel, the connection between the belt drive and the clutch plates being such that each plate drives the belt and propulsion wheel in an opposite direction to provide forward and reverse drive for said wheel, cam follower means associated with each of said clutches, and a movable shifting member having a camming surface opposed to and contiguous with adjacent pairs of said cam follower means, said camming surface including a pair of drive promoting cam portions and an idling portion and means for moving said member to selectively engage one of said drive promoting cam portions with one of said cam followers or with said idling portion to transmit forward or reverse driving power to said propulsion wheel or simultaneously disengage both clutches to permit idling of said wheel.

2. A self-propelled vehicle having a pair of spaced apart independently rotatable propulsion wheels, a caster wheel for maneuverability thereof, an operating cab and a source of power for driving said wheels, a common drive shaft driven by said power source and supplying driving power to each of said propulsion wheels, a separate transmission system for transmitting propelling power from said common drive shaft to each of said wheels, each said transmission system comprising a pair of juxtaposed substantially aligned axially parallel clutches, each said clutch comprising a pair of rotatable, co-axially mounted clutch plates adapted for relative axial movement into and out of frictional clutching engagement with one another, belt drive means interconnecting one clutch plate of each clutch with each other and with said common drive shaft to rotate said clutch plates simultaneously in the same direction, belt drive means interconnecting the other clutch plate of each clutch with each other and with a propulsion wheel, each of said other clutch plates being engaged with opposite sides of said belt drive means for reverse driving of said belt drive means and said propulsion wheel, follower means carried by each clutch directing the relative axial movement of the clutch plates constituting said clutch, an elongate slidable shifting member having a camming surface disposed transversely of the axis of rotation of said clutches and contiguously opposed to each of said cam follower means, said camming surface including a pair of longitudinally spaced apart protruding follower engaging drive promoting cam portions and an elongate recessed idling portion intermediate said cam portion for disengaging either of said clutches or both simultaneously, and means including a single operating member in the cab for reciprocating said slidable member across said cam followers to selectively engage one of said cam portions with one of said cam follower means to drivingly engage one of said clutches while simultaneously idling the other to optionally drive the propulsion wheel forwardly or backwardly or to simultaneously disengage both clutches to idle said wheel.

3. In a self-propelled vehicle having independently rotatable propulsion wheels and a source of power for driving said wheels, a separate transmission system for propelling each of said wheels, each said transmission system comprising a pair of clutches, each of said clutches comprising a pair of rotatable, co-axially mounted clutch plates adapted for movement into and out of frictional clutching engagement with one another, first belt drive means interconnecting one clutch plate of each clutch with each other and with the source of power and adapted to rotate said clutch plates simultaneously, second belt drive means interconnecting the other clutch plate of each clutch with each other and with the propulsion wheel, one of said belt drive means being wound in the same direction with respect to the plates engaged therewith whereby movement thereof in one direction causes rotation of said plates in the same direction, the other of said belt drive means being wound in opposite directions with respect to the plates engaged therewith whereby movement thereof in one direction causes rotation of said plates in opposite directions, cam follower means associated with each of said clutches, and a movable shifting member having a camming surface opposed to and contiguous with adjacent pairs of said cam follower means, said camming surface including a pair of drive promoting cam portions and an idling portion and means for moving said member to selectively engage one of said drive promoting cam portions with one of said cam followers or with said idling portion to transmit forward or reverse driving power to said propulsion wheel or simultaneously disengage both clutch to permit idling of said wheel.

4. In a self-propelled vehicle having independently rotatable propulsion wheels and a source of power for driving said wheels, a separate transmission system for propelling each of said wheels, each said transmission system comprising a pair of clutches, each of said clutches comprising a pair of rotatable, co-axially mounted clutch plates adapted for movement into and out of frictional clutching engagement with one another, first belt drive means interconnecting one clutch plate of each clutch with each other and with the source of power and adapted to rotate said clutch plates simultaneously, second belt drive means interconnecting the other clutch plate of each clutch with each other and with the propulsion wheel, one of said belt drive means being wound in the same direction with respect to the plates engaged therewith whereby movement thereof in one direction causes rotation of said plates in the same direction, the other of said belt drive means being wound in opposite directions with respect to the plates engaged therewith whereby movement thereof in one direction causes rotation of said plates in opposite directions with respect to each other, cam follower means cooperatively interconnected with each of said clutches, and shifting means including single cam members interconnected by a single shiftable connecting member and contiguous with each of said cam follower means and adapted to selectively cammingly engage one or the other of said cam follower means upon shifting movement of said connecting member for selectively engaging one or the other of said clutches or to simultaneously disengage both of them to permit idling of said wheel.

References Cited in the file of this patent

UNITED STATES PATENTS

| | | |
|---|---|---|
| 821,477 | Flinchbaugh | May 22, 1906 |
| 1,027,027 | Bailey | May 21, 1912 |
| 1,470,078 | Hellwarth | Oct. 9, 1923 |
| 1,623,929 | Loyd | Apr. 5, 1927 |
| 2,336,642 | Schreck | Dec. 14, 1943 |
| 2,572,911 | Brown | Oct. 30, 1951 |
| 2,874,591 | Thoma | Feb. 24, 1959 |